United States Patent [19]
Kurotobi et al.

[11] Patent Number: 6,016,948
[45] Date of Patent: Jan. 25, 2000

[54] METHOD OF FORMING PIPE SPIGOT RIDGE

[75] Inventors: Manabu Kurotobi, Takarazuka; Mutsuo Uchida, Osaka; Takahiro Tanaka, Izumiotsu; Tsuneo Suzuki, Yachiyo; Yutaro Takahashi, Amagasaki, all of Japan

[73] Assignee: Kubota Corporation, Osaka, Japan

[21] Appl. No.: 08/828,535

[22] Filed: Mar. 31, 1997

[30] Foreign Application Priority Data

Jul. 11, 1996 [JP] Japan ................................. 8-181729

[51] Int. Cl.[7] ................................................. F16L 9/02
[52] U.S. Cl. ........................... 228/135; 228/102; 228/212; 228/49.3; 219/125.1; 219/137.9; 219/137.2
[58] Field of Search ...................... 228/135, 102, 228/212, 49.3; 219/125.1, 137.9, 137.2

[56] References Cited

U.S. PATENT DOCUMENTS

| | | | |
|---|---|---|---|
| 3,640,556 | 2/1972 | Bennett | 287/189.36 B |
| 3,858,912 | 1/1975 | Bower | 285/230 |
| 4,579,273 | 4/1986 | Dahmen et al. | 228/102 |
| 4,873,419 | 10/1989 | Acheson | 219/125.1 |

*Primary Examiner*—Patrick Ryan
*Assistant Examiner*—M. Alexandra Elve
*Attorney, Agent, or Firm*—Reising, Ethington, Barnes, Kisselle, Learman & McCulloch, PC

[57] ABSTRACT

A method of forming a ridge around the outer circumference of a spigot formed at an end of a pipe. A ring having a certain wall thickness in its radial direction and formed with a peripheral groove on its outer circumference is placed around the outer circumference of the spigot. Then molten metal is poured into the peripheral groove, so that the bottom of the peripheral groove and the surface of the spigot are melted, thus joining the ring and spigot together.

10 Claims, 6 Drawing Sheets

METHOD OF FORMING PIPE SPIGOT RIDGE

FIELD OF THE INVENTION

The present invention relates to a method of forming a pipe spigot ridge, and more particularly to a method of forming a ridge around the outer circumference of the end of a spigot of a cast iron pipe.

BACKGROUND OF THE INVENTION

As a kind of pipe joint, there is known a slip-on type pipe joint. The slip-on type pipe joint is arranged so that a socket and a spigot can be jointed by placing a sealing material around the inner circumference of the socket and then inserting the spigot into the socket while pressing the sealing material. A slip-on type pipe joint has recently been proposed which is given a function of preventing a joint separation.

In such a slip-on type pipe joint, a ridge formed around the outer circumference of the end of a spigot of a cast iron pipe engages with a lock ring received in the inner circumference of a socket to prevent a joint separation. When the ridge around the end of the spigot is formed, an annular groove is formed around the outer circumference of the end of the spigot, in which groove a separation-preventing ring is secured. The ring is made of steel, high tensile cast iron such as ductile cast iron, or the like.

For a known ridge, a ring having a slit on its circumference is generally fitted into a groove formed in the outer surface of a spigot and then secured by welding.

The known art has a problem that the ridge formation is laborious because the outer surface of a spigot needs be formed with a groove.

DISCLOSURE OF THE INVENTION

It is an object of the present invention to eliminate a groove in the outer surface of a spigot of a cast iron pipe so that a ridge can be easily formed.

To this end, the method of forming a ridge around the outer circumference of a spigot formed at an end of a pipe according to the present invention comprises: placing around the outer circumference of the spigot a ring having a certain wall thickness in its radial direction and formed with a peripheral groove on its outer circumference; pouring molten metal into the groove to melt the bottom of the groove and the surface of the spigot; and thus joining the ring and spigot together.

Melting both the bottom of the peripheral groove and the surface of the spigot makes it possible to quickly and easily join the ring and spigot together without other work.

In case the pipe and ring are made of cast iron, MIG welding in a helium-containing gas by use of a nickel-containing material is favorable to melting both the bottom of the peripheral groove and the surface of the spigot since the welding allows deep welding penetration.

According to the present invention, a strip of ring material is wound around the outer circumference of the spigot to place the ring around the spigot.

This eliminates the need for laborious operations, such as choosing a ring with a diameter corresponding to the outer diameter of a spigot measured so that the ring can be fitted over the spigot. In addition, it is unnecessary to keep on hand a plurality of rings with different diameters since the ring material according to the present invention, which is not in a form of a ring but of a strip, has only to be wound around the pipe and not to be tightly fitted to the pipe.

According to the present invention, a roller with a pair of flanges presses the ring against the outer surface of the spigot, thus allowing one flange to come in contact with both the end of the spigot and one end of the ring and the other flange to engage with the ring.

Thus the ring can be welded to the spigot while the roller presses the ring in the direction of the radius of the pipe, with the pipe and ring correctly positioned in the direction of the axis of the pipe by the roller. The other flange preferably fits into the peripheral groove of the ring.

DETAILED DESCRIPTION OF THE EMBODIMENTS

Figure 2:
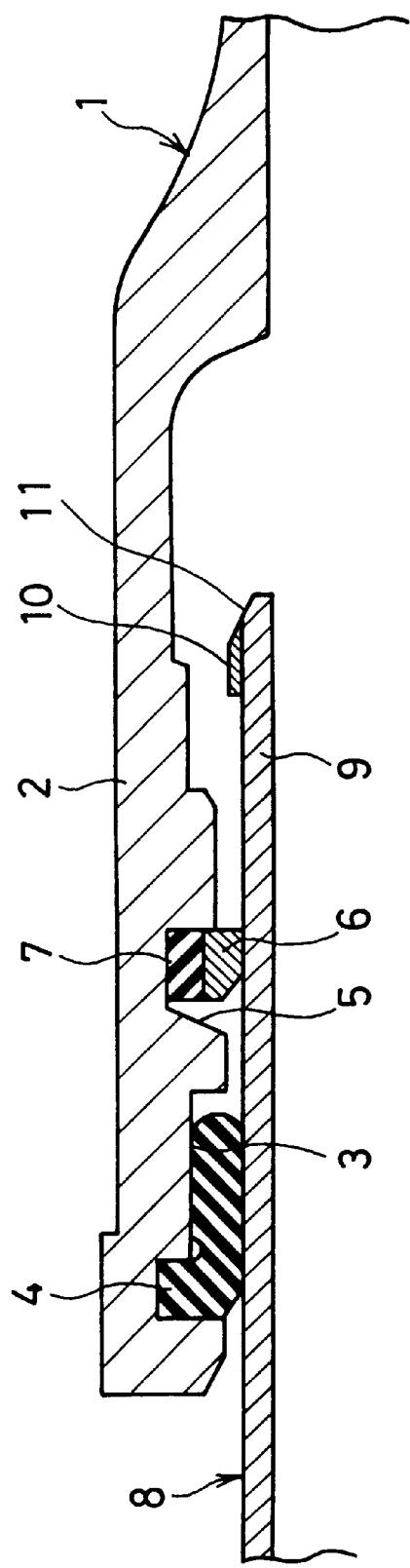
FIG. 2 shows a pipe joint designed to prevent a joint separation using a cast iron pipe having at its spigot end a ridge formed by the method of FIG. 1.

In FIG. 2, a socket 2 is formed at one end of a cast iron pipe 1 to be jointed with another, and circular rubber sealing packing 4 is placed in a packing housing groove 3 around the inner circumference of the socket 2. A lock ring 6 having a slit on its circumference is installed in a lock ring housing groove 5 formed in a farther inside area of the cast iron pipe than the packing housing groove 3. A holding rubber ring 7 is interposed between the outer circumference of the lock ring 6 and the inner circumference of the lock ring holding groove 5 for holding the lock ring 6 in an aligned condition. The holding rubber ring 7 is bonded, for example, to the outer circumference of the lock ring 6.

A ridge 10 is formed around the outer circumference of the end of a spigot 9 of another cast iron pipe 8 so that the ridge engages with the lock ring 6 when inserted far into the socket beyond the lock ring 6 and then withdrawn. A tapered surface 11 is formed around the outer circumference of the end of the spigot 9 consisting the ridge 10, so that the surface 11 guides the spigot 9 when it is inserted into the socket 2, containing the sealing packing 4 and the lock ring 6.

Below is described a method of forming the ridge 10 at the outer circumference of the end of the spigot 9.

Figure 1A:
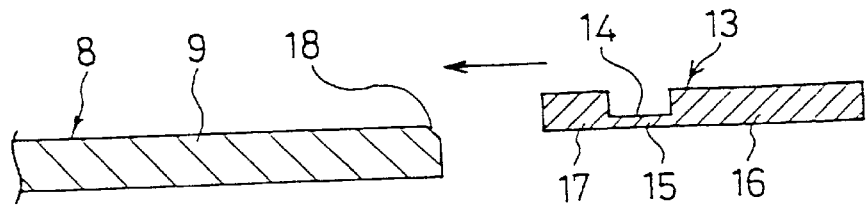
FIG. 1 is a cross-sectional view illustrating a method of forming a pipe spigot ridge according to an embodiment of the present invention.

As shown in FIG. 1(a), a ring 13 is press fitted over the outer circumference of the spigot 9 of the cast iron pipe 8. The ring 13 is of a cast iron cylinder configuration whose cross section is rectangular. Around the outer circumference of the ring 13, a peripheral groove 14 is formed. The peripheral groove 14 is arranged so that the wall thickness of the bottom 15 is as thin as possible. The peripheral groove 14 is also formed so that a part 16 of the ring 13, providing the end of the spigot 9, is longer than a part 17 of the ring, that is, a part excluding the part 16 and the peripheral groove 14. At the end of the spigot 9, a tapered surface 18 is formed which guides the ring 13 when it is press fitted over the pipe 8.

Figure 1B:
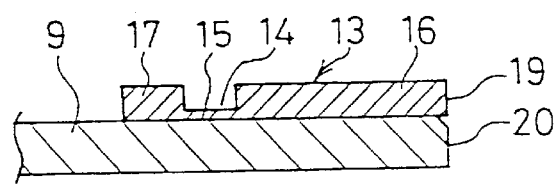

As shown in FIG. 1(b), once the ring 13 is press fitted until the end surface 19 of the ring 13 is flush with the end surface 20 of the spigot 9, a molten metal is poured into the peripheral groove 14 by MIG welding using wire with a high content of nickel while the pipe 8 is being rotated about its axis. The MIG welding is performed in a gas containing helium. Then melting occurs deeply, so that both the bottom 15 of the peripheral groove 14 and the surface of the spigot 9 melt. For example, Ar 80%—He 20% gas is preferably used as the gas containing helium.

Figure 1C:
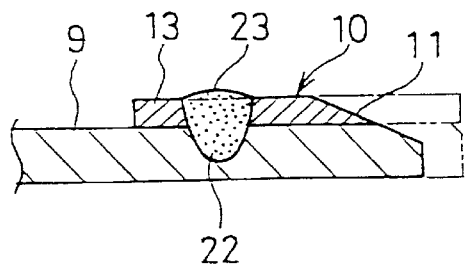

FIG. 1(c) shows the spigot end completed. A numeral 22 indicates a weld bead thus formed. Since melting deeply penetrate the pipe 8 as described above, sufficient weld strength is provided without cutting off the bottom 15 of the peripheral groove 14.

To smooth the outer surface of the ring 13, a swelling 23 of the weld bead 22, protruding outwardly from the ring 13, is cut off. Finally, the spigot 12 and the ring 13 are tapered to form the tapered surface 11.

The foregoing configuration shown in FIG. 1 is favorably applicable to the pipe 8 having a relatively small diameter.

Figure 3:
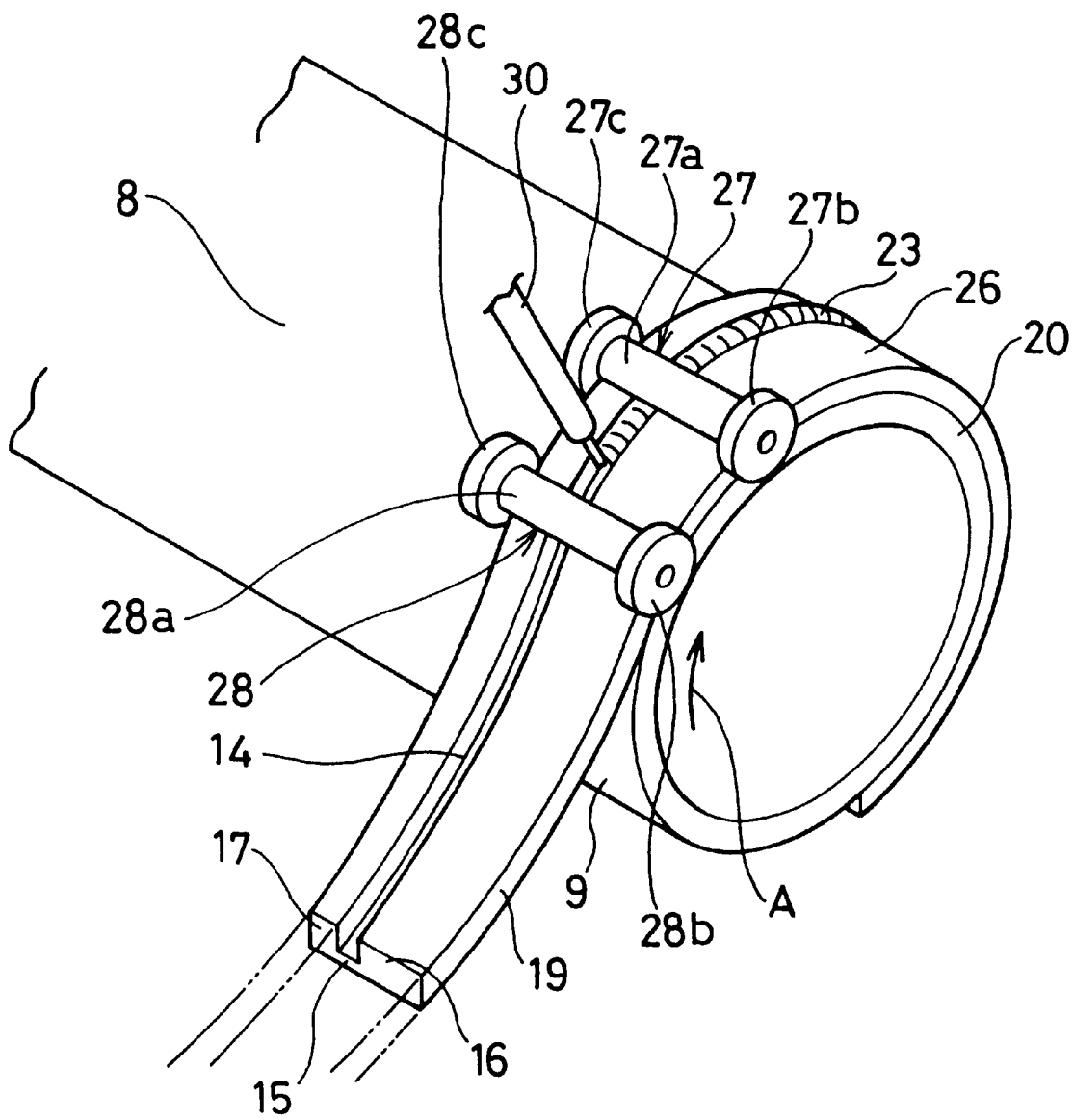
FIG. 3 is a perspective view illustrating a method of forming a pipe spigot ridge according to another embodiment of the present invention.
Figure 4:
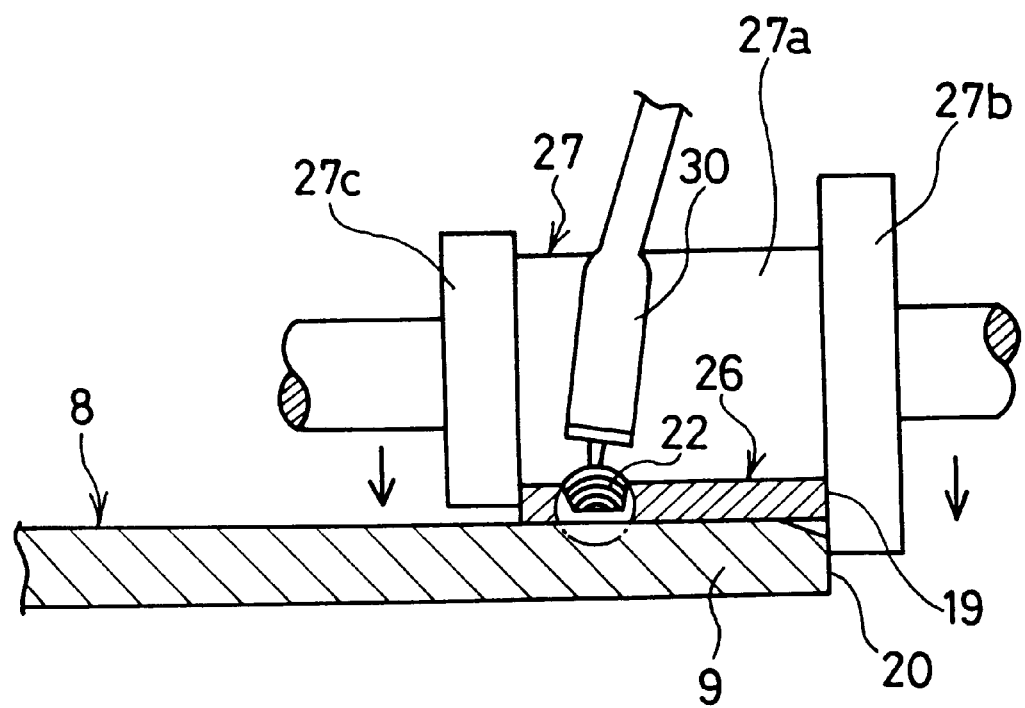
FIG. 4 is a front view illustrating the portion shown in FIG. 3.

FIGS. 3 and 4 show another embodiment of the present invention, which is favorably applicable to such a pipe as having a larger diameter than that of the pipe for FIG. 1. In FIGS. 3 and 4, a numeral 26 designates a ring material strip with the same cross section as the ring 13 in FIGS. 1 and 2. As shown in FIG. 3, the ring material strip 26 can be wound around the outer circumference of the end of a spigot 9 of a pipe 8.

A pair of rollers 27 and 28 whose axes are parallel with that of the pipe 8 are disposed along the outer surface of the pipe 8, extending from the end surface 20 of the spigot 9 of the pipe 8. The rollers 27 and 28 are apart from each other along the circumference of the pipe 8.

The rollers 27 and 28 have holding shafts 27a and 28a, large-diameter parts 27b and 28b formed at one end of the holding shafts 27a and 28a, and small-diameter parts 27c and 28c formed at the other end of the holding shafts 27a and 28a. The holding shafts 27a and 28a press the ring material strip 26 against the spigot 9 in the direction of its radius. The large-diameter parts 27b and 28b are in contact with the end surface 20 of the spigot 9 and one end 19 of the ring material strip 26. The length of the holding shafts 27a and 28a corresponds to the width of the ring material strip 26. Thus the small-diameter parts 27c and 28c can come in contact with the other end of the ring material strip 26. This allows the ring material strip 26 to be positioned with respect to the pipe 8 so that the end 19 of the strip 26 is flush with the end surface 20 of the spigot 9.

An MIG welding torch 30 is disposed between the rollers 27 and 28 along the circumference of the spigot 9 to aim at the peripheral groove 14. The torch 30 allows metal deposits to be formed in the peripheral groove 14.

To form the ridge 10 around the outer circumference of the end of the spigot 9, the weld bead 22 is formed in the peripheral groove 14 by using the torch 30 while the pipe 8 is slowly rotated about its axis in a direction A, with the ring material strip 26 pressed by the rollers 27 and 28 against the pipe 8 in the direction of its radius in a longitudinally positioned condition as described above.

The operation above causes the ring material strip 26 to be securely wound around the spigot 9. During the operation, the rollers 27 and 28 rotate as the pipe 8 rotates, while pressing the ring material strip 26 against the pipe 8. The ring material strip 26 is cut to a length corresponding to the perimeter of the spigot 9 during welding since the length corresponding to the perimeter of the spigot 9 is used while being wounded around the spigot 9.

Molten metal is poured into the peripheral groove 14 by MIG welding using the torch 30 and wire with a high content of nickel to form a weld bead 22. Performing the welding in a gas containing helium allows melting to penetrate deeply, thus melting the bottom 15 of the peripheral groove 14 and the surface of the spigot 9, so that the ring material strip 15 is securely welded to the surface of the spigot 9.

Then a swelling 23 of the weld bead 22 is cut off, and a tapered surface 11 is formed as in FIG. 1.

Figure 5:
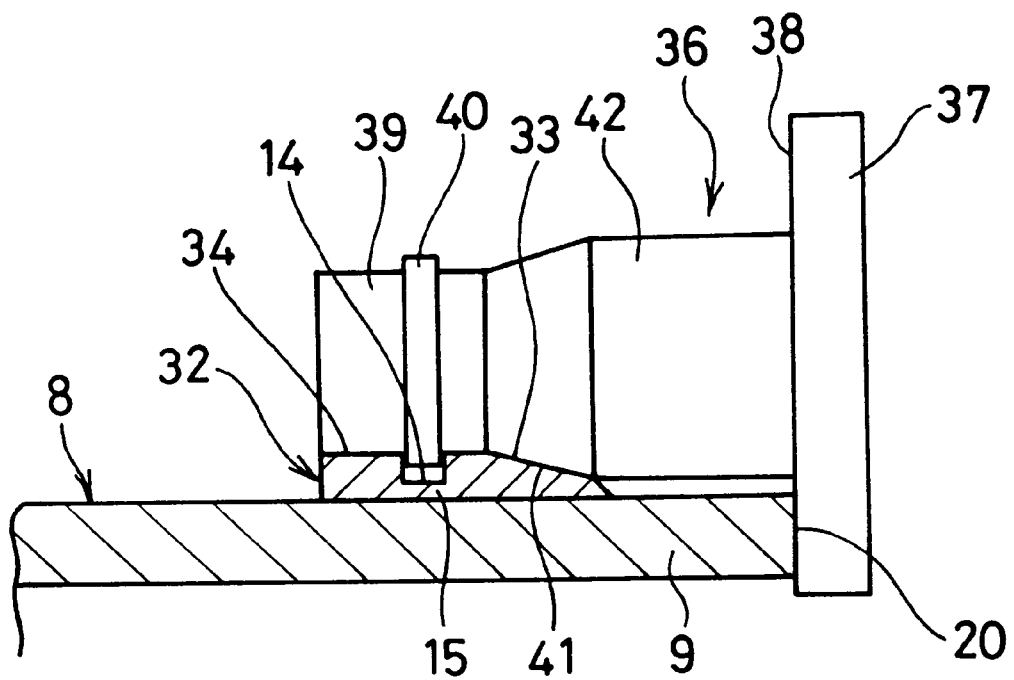
FIG. 5 is a front view illustrating a method of forming a pipe spigot ridge according to still another embodiment of the present invention.
Figure 6:
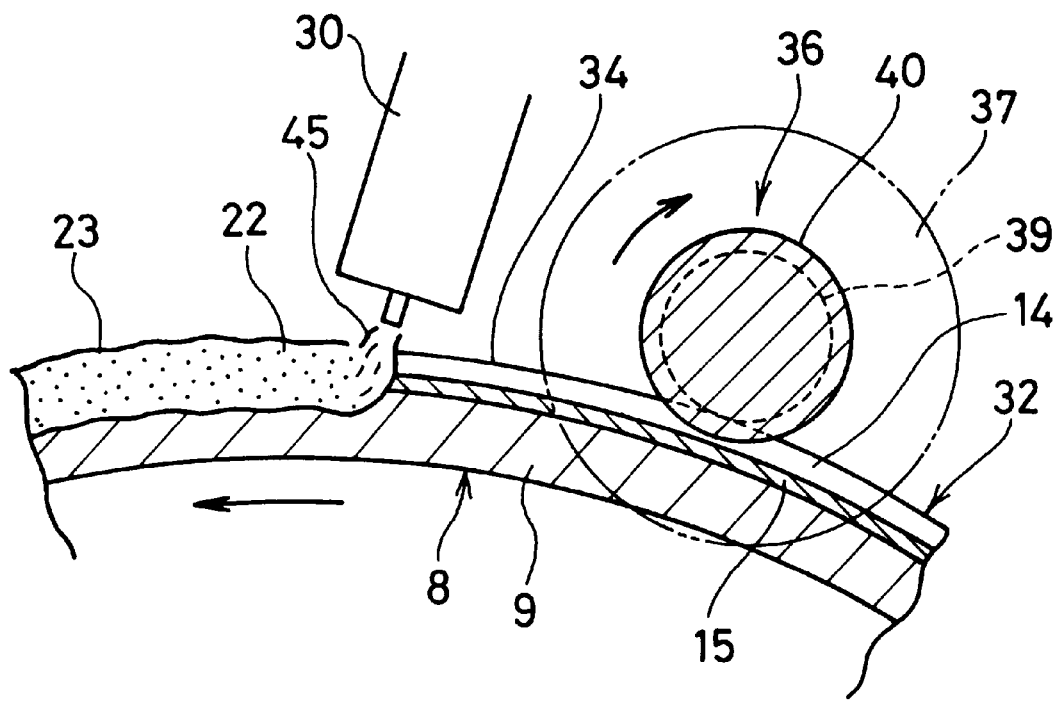
FIG. 6 is a cross-sectional side view illustrating the portion shown in FIG. 5.
Figure 7:
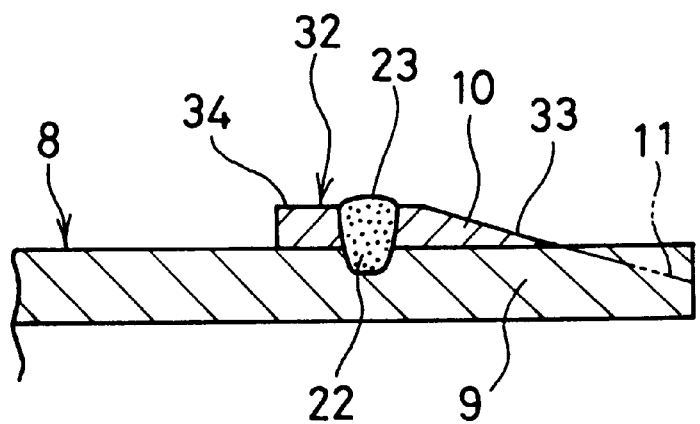
FIG. 7 is a longitudinal cross-sectional view of the portion of FIG. 6 where welding of a ring and a spigot is completed.

FIGS. 5 through 7 show still another embodiment of the present invention, which is favorably applicable to such a pipe as having a larger diameter than that of the pipe for FIG. 1.

As shown in FIG. 5, a metal ring 32 is elastically fitted over the outer circumference of a spigot 9. The ring 32 having a slit on its circumference has a peripheral tapered part 33 which progressively becomes smaller in diameter toward the end of the spigot 9 and an outer surface 34 parallel to the axis of the spigot 9. A peripheral groove 14 with a rectangular cross section is formed around the outer surface 34. A numeral 15 indicates the bottom of the groove 14.

The ring 32 is pressed against the outer surface of the spigot 9 by a positioning roller 36. The positioning roller 36 has a flange 37, which is arranged so that its side surface 38 comes in contact with the end surface 20 of the spigot 9. The positioning roller 36 also has a roller part 39, coming in contact with the outer surface 34 of the ring 32. A circular projection 40, which has a rectangular cross section and a flange structure, is formed on the roller part 39 to fit into the peripheral groove 14 of the ring 32.

In detail, the circular projection 40 is made a little narrower than the peripheral groove 14. Thus when the circular projection 40 fits into the peripheral groove 14, with the side 38 of the flange 37 of the positioning roller 36 in contact with the end surface 20 of the spigot 9, the spigot 9 and the ring 32 become unable to move relative to each other in the direction of the axis of the cast iron pipe 8, so that the ring 32 is correctly positioned with respect to the spigot 9 in that direction. The circular projection 40 is formed so that its circumference does not come in contact with the bottom 15 of the groove 14.

The positioning roller 36 also has a tapered part 41 in contact with the tapered part 33 of the ring 32. The tapered part 41 and the flange 37 are combined into one by a shaft 42. The shaft 42 has such a diameter that it does not come in contact with the outer surface of the spigot 9.

Thus when the positioning roller 36 presses the ring 32 as shown in FIG. 5, the circular projection 40 fits into the peripheral groove 14 in the ring 32, with the side surface 38 of the flange 37 of the positioning roller 36 in contact with the end surface 20 of the spigot 9. Then the roller 36 presses the ring 32, positioned with respect to the spigot 9 in the direction of its axis, against the outer surface of the spigot 9 to prevent the ring 32 from separating from the outer surface of the spigot 9.

As shown in FIG. 6, the bottom 15 of the groove 14 and the surface of the spigot 9 are melt by pouring molten metal 45 immediately behind the roller part 39 of the positioning roller 36 into the peripheral groove 14 while the spigot 9 is being slowly rotated about its axis. This causes the ring 32 to be welded around its circumference when it is positioned in the direction of the axis of the spigot 9 and in contact with the outer surface of the spigot 9, as shown in FIGS. 5 and 6. A numeral 22 indicates a weld bead.

Since the weld bead 22 has a swelling 23 protruding outwardly from the ring 32 as shown in FIGS. 6 and 7, the swelling 23 is cut off to smooth the outer surface 34 of the ring 32. Finally, the spigot 9 is tapered according to the tapered part 33 of the ring 32 to form the tapered surface 11.

What is claimed is:

1. A method of forming a ridge around the outer circumference of a spigot formed at an end of a pipe, the method comprising:

placing around the outer circumference of the spigot a ring having a certain wall thickness in its radial direction and formed with a peripheral groove on its outer circumference;

pouring molten metal into the groove to melt the bottom of the groove and the surface of the spigot and form a weld bead to join the ring and spigot together.

2. A method of forming a ridge according to claim 1, wherein the ring is tightly fitted around the outer circumference of the spigot.

3. A method of forming a ridge according to claim 1, wherein a ring material strip is wound around the outer circumference of the spigot.

4. A method of forming a ridge according to claim 1, wherein the ring has a slit on its circumference and is elastically fitted over the outer circumference of the spigot.

5. A method of forming a ridge according to claim 1, wherein the pipe and the ring are made of cast iron, the molten metal is a nickel-containing material, and MIG welding is performed in a gas containing helium.

6. A method of forming a ridge according to claim 1, wherein the ring is pressed by a roller against the outer surface of the spigot.

7. A method of forming a ridge according to claim 6, wherein the ring is axially positioned with respect to the spigot by means of the roller.

8. A method of forming a ridge according to claim 7, wherein the roller has a pair of flanges, one flange being in contact with both the end surface of the spigot and one end of the ring, and the other flange engaging with the ring.

9. A method of forming a ridge according to claim 8, wherein the other flange of the roller is in contact with the other end of the ring.

10. A method of forming a ridge according to claim 8, wherein the other flange of the roller fits into the peripheral groove of the ring.

* * * * *